(12) United States Patent
Tamm et al.

(10) Patent No.: US 10,307,826 B2
(45) Date of Patent: Jun. 4, 2019

(54) COUPLING DEVICE FOR A DRIVE DEVICE, AND DRIVE DEVICE

(71) Applicant: ILLINOIS TOOL WORKS INC., Glenview, IL (US)

(72) Inventors: Markus Tamm, Ueberlingen (DE); Andreas Frank, Hilzingen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 703 days.

(21) Appl. No.: 14/655,901

(22) PCT Filed: Dec. 12, 2013

(86) PCT No.: PCT/US2013/074546
§ 371 (c)(1),
(2) Date: Jun. 26, 2015

(87) PCT Pub. No.: WO2014/105434
PCT Pub. Date: Jul. 3, 2014

(65) Prior Publication Data
US 2015/0354634 A1    Dec. 10, 2015

(30) Foreign Application Priority Data
Dec. 28, 2012 (DE) .......... 10 2012 224 524

(51) Int. Cl.
*F16D 1/06* (2006.01)
*B23B 3/26* (2006.01)
(Continued)

(52) U.S. Cl.
CPC ............. *B23B 3/26* (2013.01); *B23B 5/163* (2013.01); *F16D 1/06* (2013.01); *F16D 1/076* (2013.01);
(Continued)

(58) Field of Classification Search
CPC ..... B23B 5/163; B23B 2260/084; B23B 3/26; F16D 1/06; F16D 1/076; F16D 1/108; Y10T 403/7062
(Continued)

(56) References Cited

U.S. PATENT DOCUMENTS 1,442,659 A * 1/1923 Groene ................ B23B 31/117
279/103
4,303,357 A 12/1981 Makar
(Continued)

FOREIGN PATENT DOCUMENTS

DE 1531988 12/1942
DE 1602920 A1 5/1970
(Continued)

OTHER PUBLICATIONS

ISR and WO for PCT/US2013/074546 dated Mar. 25, 2014.

*Primary Examiner* — Amber R Anderson
*Assistant Examiner* — Nahid Amiri
(74) *Attorney, Agent, or Firm* — Thompson Hine LLP

(57) ABSTRACT

A coupling device for the force-related connection of a device for machining pipes or pipe ends to a drive device is provided. With the aim of a high degree of variability, the coupling device has at least one force transmission device with at least one force transmission element for transmitting rotary forces to at least one force absorption element of at least one force absorption device with respect to a drive axis, wherein the at least one force transmission device is configured to be brought into connection optionally and alternately with force absorption devices which each differ in design with respect to the force absorption elements thereof and preferably differ in design with respect to a center distance between the force absorption elements.

23 Claims, 11 Drawing Sheets

(51) Int. Cl.
  *B23B 5/16*     (2006.01)
  *F16D 1/076*    (2006.01)
  *F16D 1/108*    (2006.01)

(52) U.S. Cl.
  CPC ........ *F16D 1/108* (2013.01); *B23B 2260/084* (2013.01); *Y10T 403/7062* (2015.01)

(58) Field of Classification Search
  USPC ........................................................ 403/380
  See application file for complete search history.

(56) References Cited

U.S. PATENT DOCUMENTS

| | | | |
|---|---|---|---|
| 4,632,614 A * | 12/1986 | Rall | B23B 29/046 |
| | | | 279/58 |
| 4,655,655 A | 4/1987 | Schuerfeld | |
| 4,668,137 A | 5/1987 | Iwakura | |
| 4,813,314 A | 3/1989 | Kwech | |
| 4,913,606 A | 4/1990 | Glaser | |
| 5,178,483 A | 1/1993 | Wang | |
| 5,584,753 A | 12/1996 | Takahashi | |
| 5,771,762 A * | 6/1998 | Bissett | B23B 31/261 |
| | | | 142/53 |
| 6,626,614 B2 * | 9/2003 | Nakamura | B23B 27/007 |
| | | | 407/48 |
| 6,880,437 B2 * | 4/2005 | Sjoo | B23B 29/043 |
| | | | 407/101 |
| 8,408,083 B2 * | 4/2013 | Nielsen | A47B 9/04 |
| | | | 74/89.2 |
| 8,616,562 B2 | 12/2013 | Maras | |
| 2004/0154838 A1 | 8/2004 | Gaul | |
| 2010/0197205 A1 * | 8/2010 | Ohnishi | B24B 41/0475 |
| | | | 451/67 |
| 2011/0227300 A1 | 9/2011 | Zhang | |
| 2011/0314978 A1 | 12/2011 | Phillips, II et al. | |
| 2012/0111145 A1 * | 5/2012 | Maekawa | H02K 3/522 |
| | | | 74/665 A |
| 2012/0112581 A1 * | 5/2012 | Maekawa | H02K 3/522 |
| | | | 310/71 |

FOREIGN PATENT DOCUMENTS

| | | |
|---|---|---|
| DE | 19512991 | 10/1995 |
| DE | 202011000517 | 10/2011 |
| JP | S58114802 A | 7/1983 |

* cited by examiner

COUPLING DEVICE FOR A DRIVE DEVICE, AND DRIVE DEVICE

RELATED APPLICATIONS

The present application is a National Phase of International Application Number PCT/US2013/074546 filed Dec. 12, 2013, and claims priority to German Application Number 10 2012 224 524.3 filed Dec. 28, 2012.

The present invention relates to a coupling device for the force-related connection of a device for machining pipes or pipe ends to a drive device in accordance with independent patent claim 1. Furthermore, the invention relates to a drive device which is provided with a coupling device of this type.

In pipeline construction, it is frequently necessary, in particular for installation and maintenance purposes, mechanically to machine center regions of pipes which are already installed and/or are to be installed and end regions (pipe ends) of pipes which are installed and/or are to be installed. Pipe parting and chamfering operations can be mentioned by way of example here, with use increasingly being made for these activities of variable, hinged devices for machining pipes or pipe ends, which devices can be installed around the outside diameter of a pipe. Such what are referred to as "split frames" here can have suitable tool slides for peripheral parting and chamfering tools, which tool slides, coupled via a corresponding gearing, can be driven in different ways, for example electrically, pneumatically or hydraulically.

A "split frame" here typically covers a pipe diameter region of approx. 150 mm. For design-related reasons, different pipelines, depending on the flow rate and the like, have different outside and inside diameters which, under some circumstances, necessitate different devices for machining pipe ends. Furthermore, different devices for machining pipe ends may be required if, for example, particular working and surrounding conditions, such as low clearance or the like, are present. Customarily, provision is therefore always made for use to be made in each case of a drive device which is matched precisely to the particular device for machining pipe ends and which is generally coupled rigidly to the device for machining pipe ends.

This gives rise to the problem that a dimensionally matching drive device has to be provided for each device for machining pipe ends.

On the basis of the problem referred to, it is the object of the present invention to provide a cost-saving and simply operable, variable solution for the force-related connection of a device for machining pipe ends to a drive device.

According to the invention, the object is achieved by the features of independent patent claim 1.

Accordingly, the object is achieved by a coupling device for the force-related connection of a device for machining pipes or pipe ends to a drive device, which coupling device has at least one force transmission device with at least one force transmission element for transmitting rotary forces to at least one force absorption element of at least one force absorption device with respect to a drive axis. The at least one force transmission device is configured in this connection to be brought into connection optionally and alternately with force absorption devices which each differ in design with respect to the force absorption elements thereof and preferably differ in design with respect to a center distance between the force absorption elements.

The coupling device according to the invention for the force-related connection of a device for machining pipes or pipe ends to a drive device affords the particular advantage here that, firstly, different devices for machining pipes or pipe ends, i.e. different pipe machining and working machines, can be universally connected to different drive devices.

Advantageous developments of the coupling device according to the invention are provided in the dependent claims.

For example, it is provided that the coupling device furthermore has at least one releasable closure device which is configured to hold a force absorption device brought into connection with the at least one force transmission device axially and radially in position when the closure device is in a closed position. A closure device of this type makes it possible comparatively rapidly to connect and optionally to release again a device for machining pipe ends to a drive device with the interconnection of the coupling device according to the invention, wherein the closure device prevents a displacement of the force absorption device relative to the drive device in the axial direction of the drive or coupling axis and, in addition prevents said force absorption device from being brought out of center, i.e. displaced in the radial direction. This ensures a reliable transmission of the rotary forces or moments from the drive device to the force absorption device and therefore to the device for machining pipes or pipe ends.

In an advantageous manner, it can be provided in this connection that the closure device is an annular closure device which is optionally tensionable and relaxable with respect to the circumference thereof and which can optionally be tensioned and relaxed with respect to the circumference thereof preferably with the aid of a snap-type closure. The annular construction results in an advantageously relatively low clearance of the closure device. Furthermore, by operation with the aid of a snap-type closure, a very rapid and, above all, tool-free connection of the device for machining pipes or pipe ends to the drive device and a likewise rapid and tool-free release of said connection are possible. By this means, without changing the variability, the time required for exchanging the device for machining pipes or pipe ends or the drive device is further reduced.

Furthermore, it can be provided that the force transmission device has force transmission elements in the form of toothed rings on at least one toothed ring. In contrast thereto, the force absorption device is generally provided only with an (outer) toothed ring. By means of the provision of toothed rings as force transmission elements and also on the opposite side as force absorption elements, force can be reliably and efficiently transmitted from the force transmission device to the force absorption device. It can advantageously be provided in this case for the force transmission device to have at least two toothed rings respectively differing in radius. By this means, it is possible in a particularly simple manner alternately and optionally to operate different devices for machining pipes or pipe ends on one and the same drive device, wherein the coupling operation takes place comparatively rapidly and simply by means of the toothed rings.

In a development of the solution according to the invention, it is also possible to provide a drive device with a coupling device according to the invention, wherein the drive device is configured to be connected to a device for machining pipes or pipe ends with the aid of a force transmission device of the coupling device for transmitting rotary forces with respect to a drive axis. By means of a construction of this type, it is possible to obtain a drive device which can be connected rapidly, simply and efficiently to different devices for machining pipes or pipe ends.

In an advantageous manner, it is provided that the drive device is a high-frequency motor. A high-frequency motor of this type, having a small overall size, achieves a very high torque and is therefore particularly appropriate for taking the place of conventional types of drive, such as hydraulics or pneumatics. In contrast thereto, with the same overall size, such high torques were not possible with conventional electric drives. With respect to the drive device, it can be provided that the at least one force transmission device of the coupling device is fastened releasably on the drive axis of the drive device. Such releasability can be provided, for example, by a screw connection or the like. The maintainability of the entire arrangement is easily possible by this means.

An embodiment of the coupling device according to the invention for the force-related connection of a device for machining pipes or pipe ends to a drive device is explained in more detail below with reference to a drawing, in which:

FIG. 4b shows a side view of the shaft of the high-frequency motor according to FIG. 4a;

FIG. 5b shows a planar view of an end surface of the inverter from FIG. 5a;

FIG. 7b shows a view of an end surface of the remote control from FIG. 7a;

Figure 1:
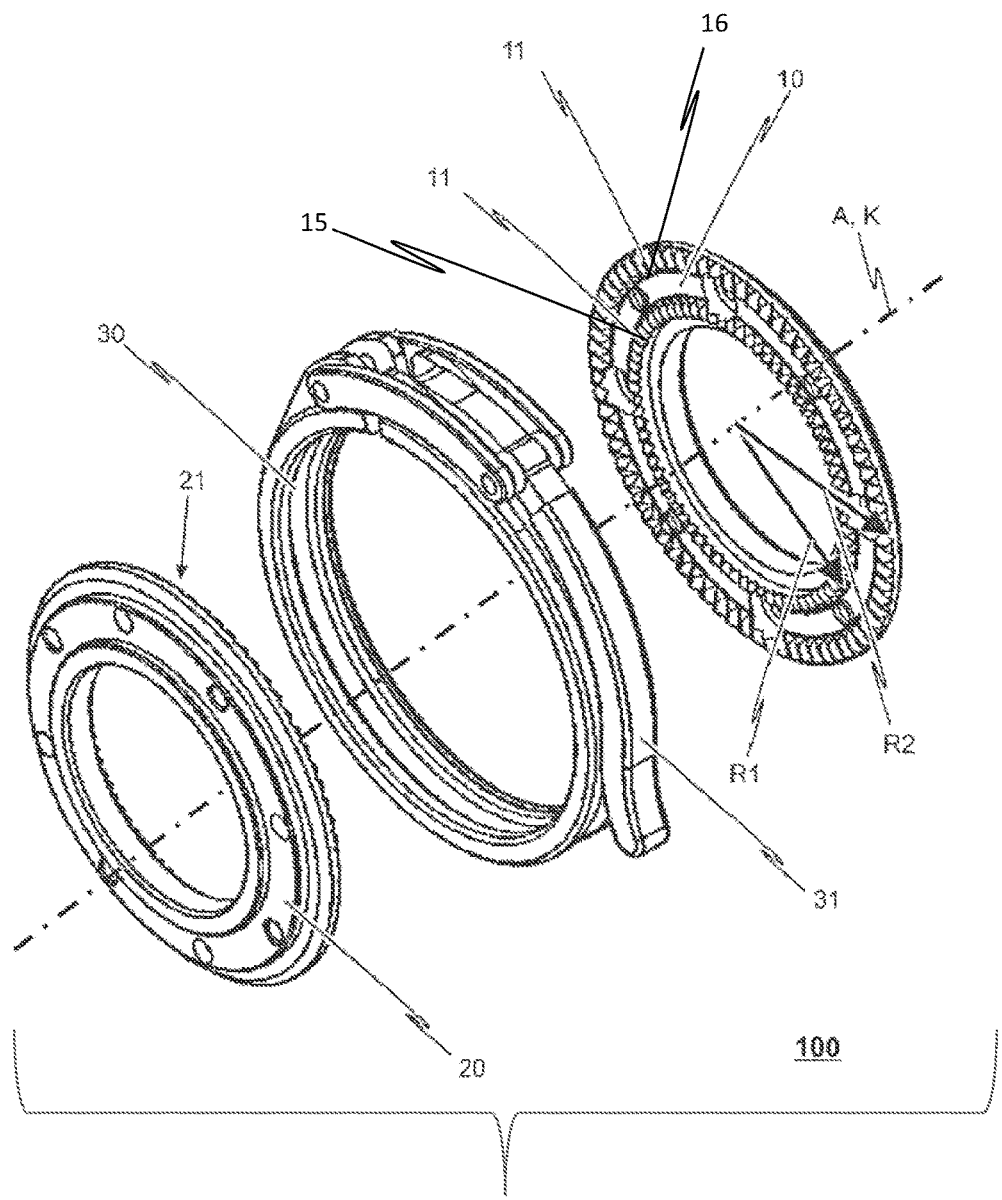
FIG. 1 shows an exemplary embodiment of a coupling device according to the invention in a perspective exploded illustration.

FIG. 1 shows, in a perspective exploded illustration, as a whole, a coupling device 100 which is connectable or is connected in a force-related manner to a device, described further below, for machining pipes or pipe ends 300 and to a drive device 200, likewise described further below, in such a manner that an optional and alternating connection to the drive device 200 for the machining of pipes or pipe ends 300 is possible.

For this purpose, the coupling device 100, according to the exemplary embodiment shown in FIG. 1, has a force transmission device 10 which, for its part, in turn has force transmission elements 11, here in the form of a first toothed ring 15 and a second toothed ring 16. In this connection, the first toothed ring 15 is arranged annularly on, or is formed integrally with, the force transmission device 10 in a first radius R1 with respect to a drive axis A, which at the same time constitutes the coupling axis K.

The second toothed ring 16 has a second toothed ring radius R2 which is larger than the first toothed ring radius R1.

As is also discussed further below, the force transmission device 10 is connected to a suitable drive device 200 to the effect that a rotary drive of the force transmission device as a whole is possible.

A force absorption device 20 serves as a counterpart to the force transmission device 10, said force absorption device 20, for its part, advantageously being connected in turn to a device for machining pipes or pipe ends 300, as is also discussed further below. The force absorption device 20 in turn has, for its part, force absorption elements 21, in turn in the form of a toothed ring in the exemplary embodiment illustrated. It is insignificant here whether the toothed ring radius of the force absorption elements 21 of the force absorption device 20 corresponds to the first toothed ring radius R1 of the force transmission device 10 or to the second toothed ring radius R2 of the force transmission device 10; by means of the coupling device 100 illustrated, it is possible, according to the exemplary embodiment shown, to connect the two types of force absorption devices, i.e. those with a toothed ring corresponding to the first toothed ring radius R1 and those with a toothed ring corresponding to the second toothed ring radius R2, to the force transmission device 10.

In order to ensure a reliable connection, to prevent an axial displacement of the force transmission device 10 relative to the force absorption device 20 along the coupling axis K and also to avoid the force transmission device 10 being brought out of center relative to the force absorption device 20, a closure device 30 which is of annular design and is optionally tensionable and relaxable with respect to the circumference thereof is provided. According to the exemplary embodiment illustrated in FIG. 1, a relaxing or tensioning operation of this type is made possible by means of a closure device 30 which, for its part, has a snap-type closure. In an open position, the circumference of the closure device 30 of annular design is increased here in such a manner that the force absorption device 20 can be brought without obstruction into engagement with the force transmission device 10.

The closure device 30 is subsequently arranged in such a manner that the outer circular surfaces of the force transmission device 10 and of the force absorption device 20 very substantially completely overlap annularly. The snap-type closure 31 is subsequently actuated and therefore the circumference of the closure device 30 reduced in such a manner that the annular inner surfaces of the closure device 30 enter into engagement with the annular circular outer surfaces of the force absorption device 20, on the one hand, and with the force transmission device 10, on the other hand, in such a manner that an axial displacement along the coupling axis K is prevented. It is thereby then also ensured that the individual toothed rings, i.e. the first toothed ring 15 and the second toothed ring 16 of the force transmission device and the force absorption elements 21, which are likewise designed in the form of toothed rings, and the force absorption device 20, on the other hand, are in secure engagement, and therefore a very substantially slip-free transmission of rotary forces from the drive device 200 connected with the aid of the coupling device 100 to the device for machining pipes or pipe ends 300 is ensured and, in particular, an undesirable bringing out of center (displacement in the radial direction) is prevented.

Figure 2:
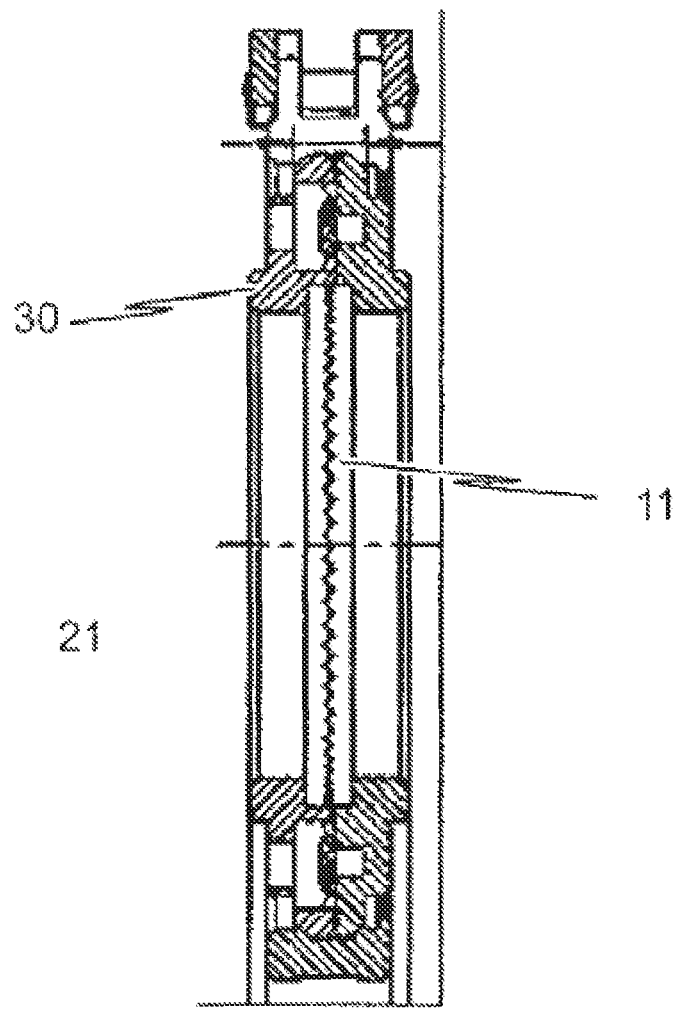
FIG. 2 shows a lateral sectional view of the coupling device from FIG. 1 in the connected state, wherein a closure device of the coupling device is in a closed position.

From the lateral sectional view in FIG. 2, it is apparent that, with the aid of the closure device 30 in the closed position thereof, the respective toothed rings on the side of the force transmission device 10, on the one hand, and on the side of the force absorption device 20, on the other hand, are in secure engagement such that a reliable transmission of torques is possible.

Figure 3:
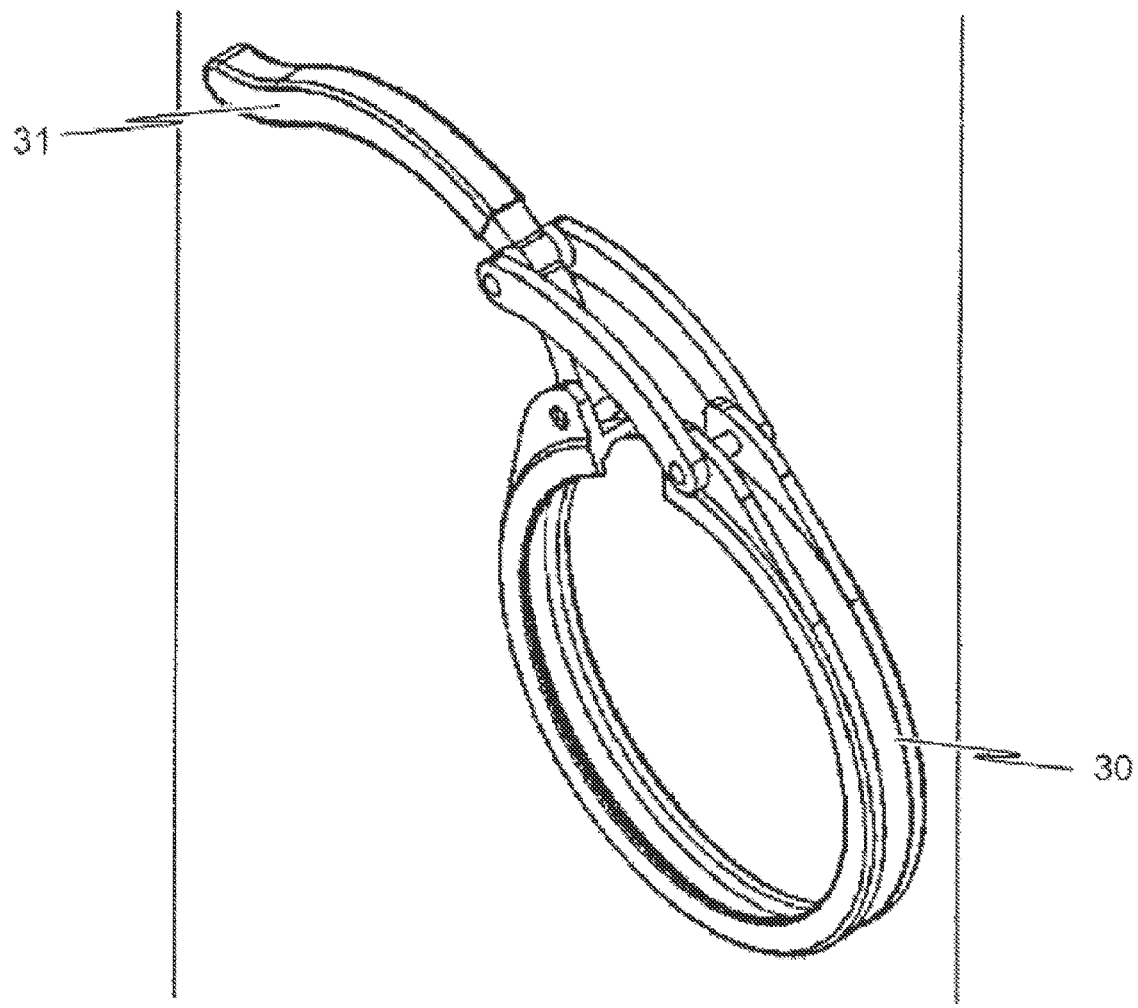
FIG. 3 shows, in a perspective view, the open closure device of the coupling device from FIG. 1.

If it is intended to release the connection between the force transmission device 10 and the force absorption device 20 again for the purpose of exchange, maintenance or the like, the closure device 30 merely has to be brought into an open position with the aid of the snap-type closure 31, as shown in the perspective illustration in FIG. 3. By this means, the circumference of the closure device 30 is in turn enlarged, as a result of which a simple and, above all, rapid parting of the force transmission device 10 from the force absorption device 20, and therefore, as a rule, also rapid parting of the device for machining pipes or pipe ends 300 from the drive device 200 are possible.

Figure 4A:
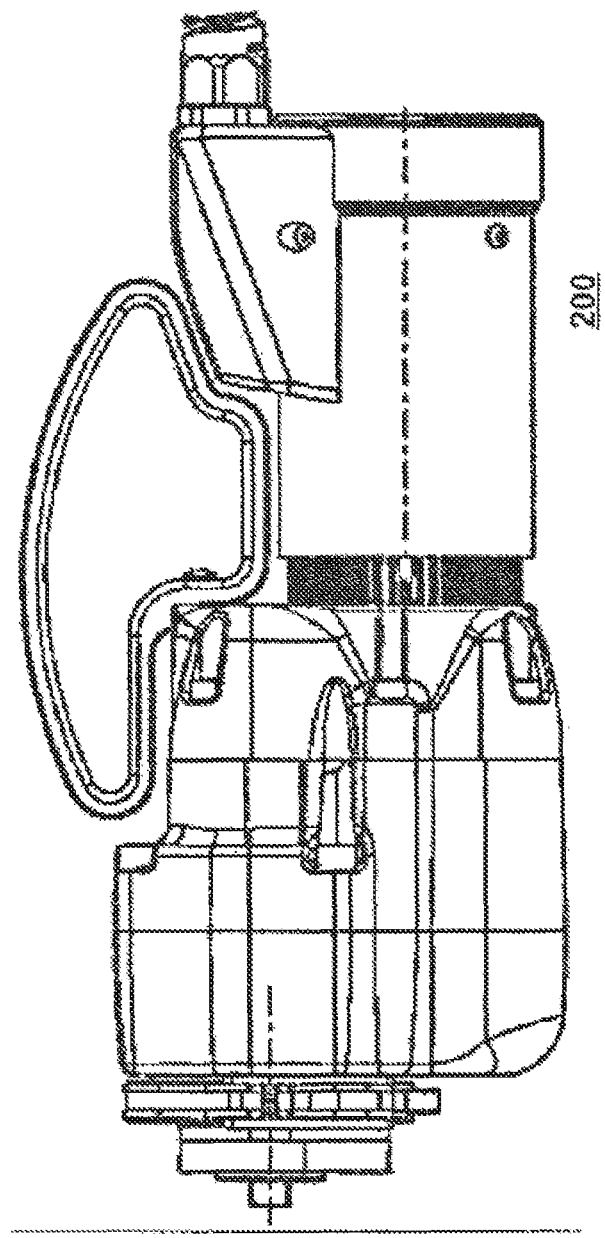
FIG. 4a shows a side view of a schematic illustration of a drive device, which is designed as a high-frequency motor, for a coupling device according to FIG. 1.
Figure 4B:
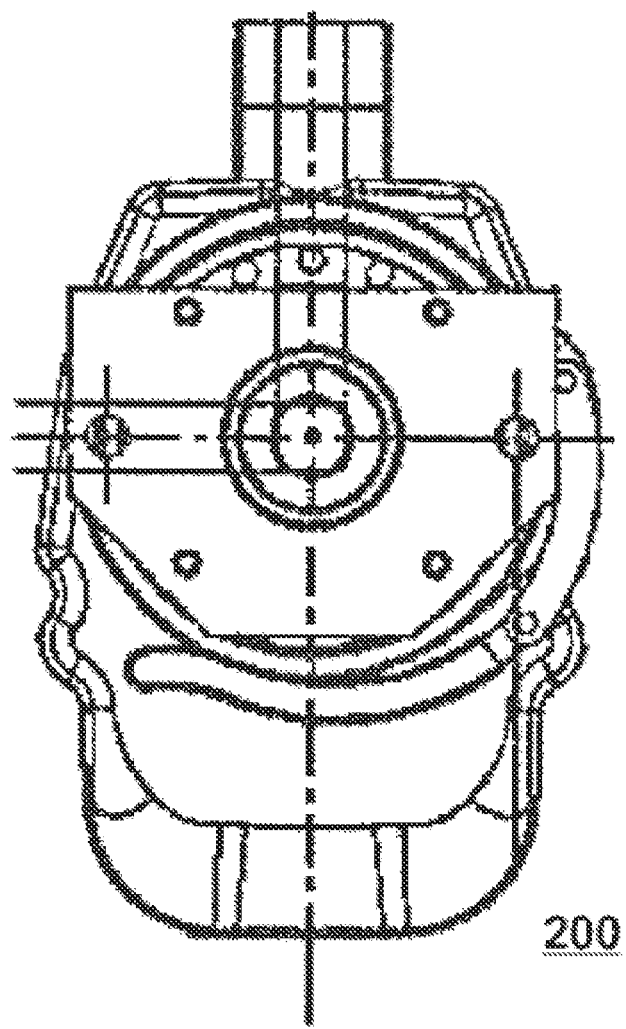

FIGS. 4a and 4b each illustrate, in a lateral schematic view, a drive device 200 which is preferably provided with the aid of the force transmission device 10 from FIG. 1 on the shaft thereof and therefore coupling with the aid of the coupling device 100 to a force absorption device 20 is made possible. The drive device 200 here is designed as a high-frequency motor which, while having a relatively small overall volume, can generate a very high torque in comparison to conventional electric motors.

Figure 5A:
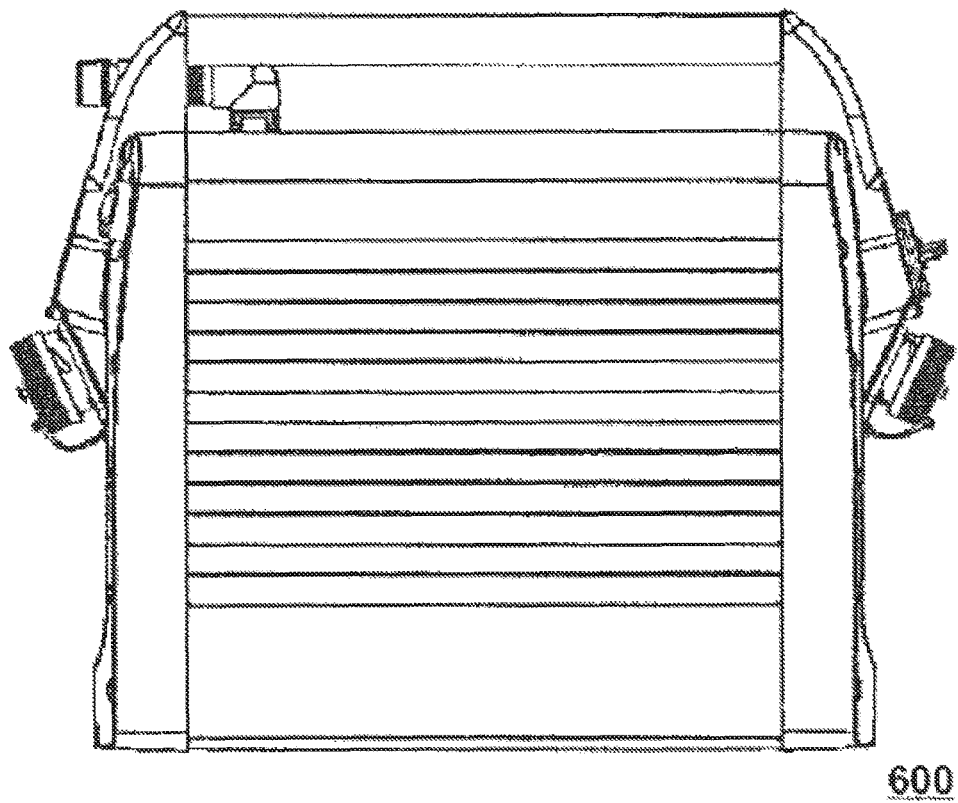
FIG. 5a shows a lateral, schematic illustration of an inverter matching the high-frequency motor from FIGS. 4a and 4b.
Figure 5B:
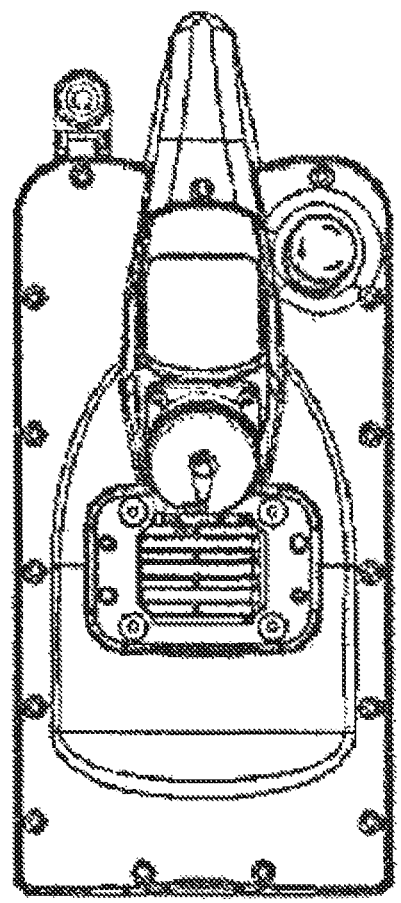

An inverter 600 suitable for driving the high-frequency motor from FIGS. 4a and 4b is shown in a schematic lateral view in both FIGS. 5a and 5b.

Figure 6:
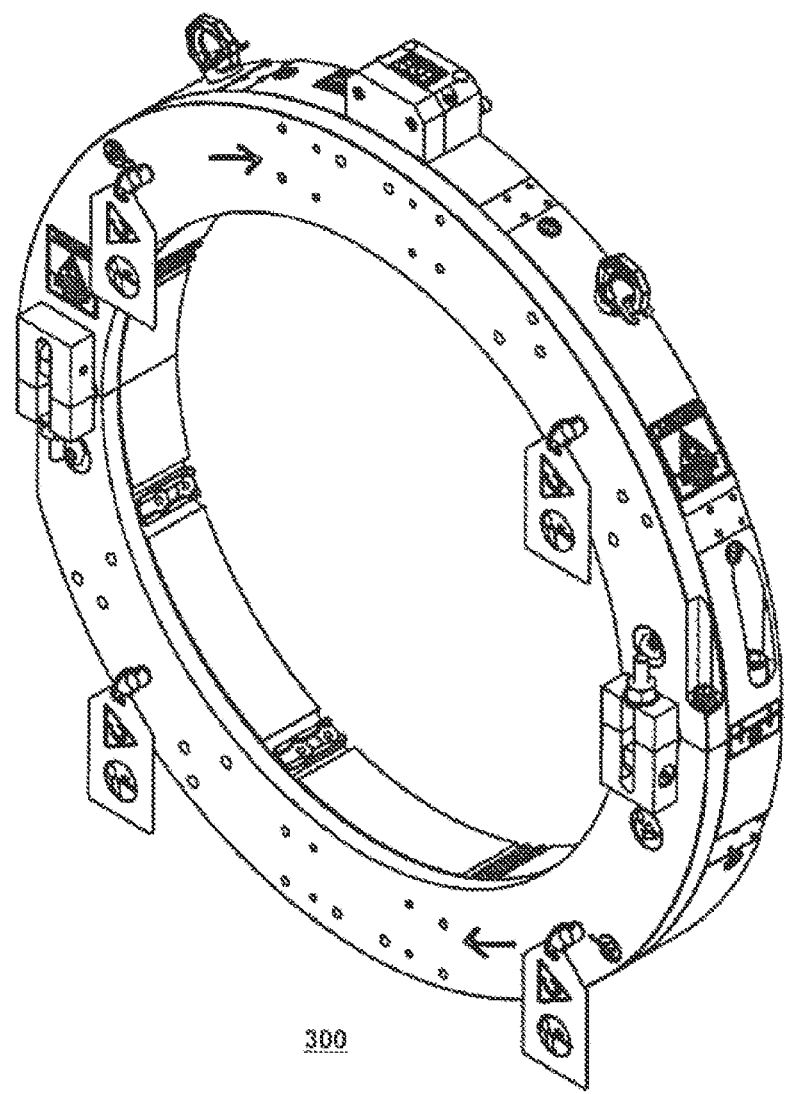
FIG. 6 shows a device for machining pipes or pipe ends for a coupling device according to FIG. 1.

FIG. 6 shows a perspective illustration of a device for machining pipe ends 300, which device is advantageously provided with a force absorption device 20 according to the exemplary embodiment in FIG. 1.

Great variability and flexibility are therefore ensured by optionally coupling the device for machining pipes or pipe ends 300 according to FIG. 6 to the drive device 200, which is designed as a high-frequency motor, from FIGS. 5a and 5b with the assistance of the closure device 30 or by optionally releasing said device after a pipe machining operation has taken place.

Figure 7A:
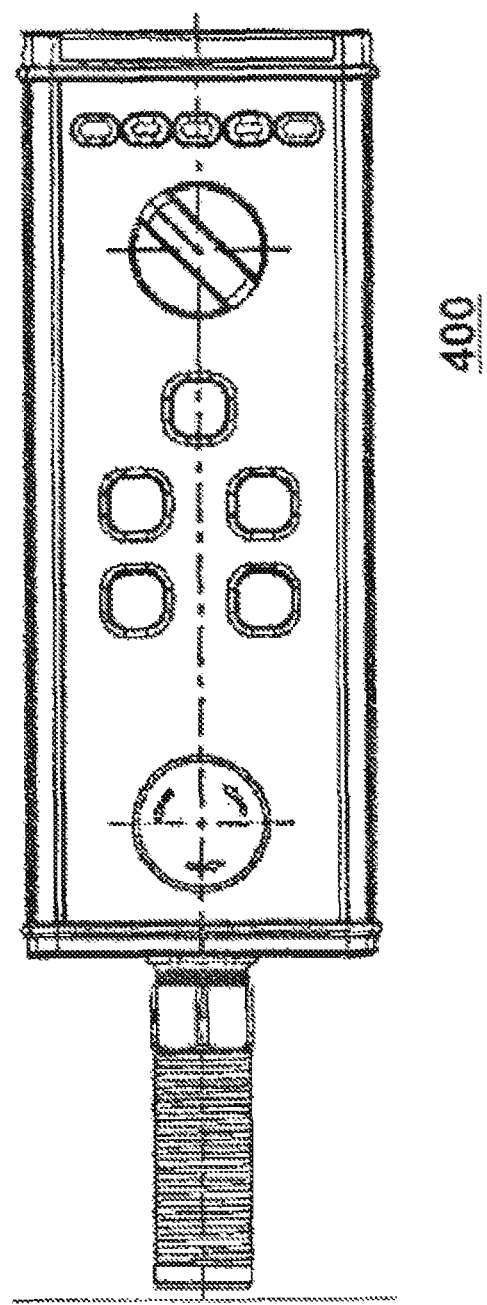
FIG. 7a shows a schematic top view of a remote control for the manually operated activation of the high-frequency motor from FIGS. 4a and 4b and of the device for machining pipes or pipe ends according to FIG. 6.
Figure 7B:
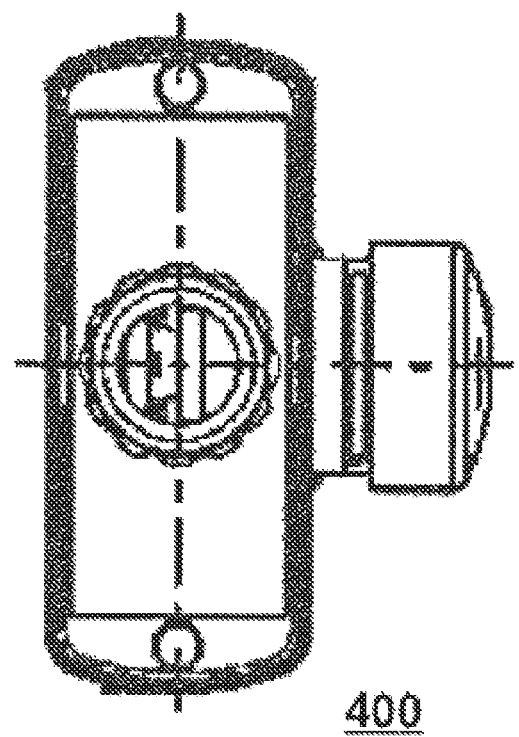

Both the drive device 200 and the device for machining pipes or pipe ends can be connected to, and manually activated by, a remote control 400, as shown schematically in FIGS. 7a and 7b. In an advantageous manner, use can also be made here of an automatic feed activation device 500 according to the perspective illustration in FIG. 8, in order to be able safely to operate the device for machining pipe ends 300 remotely without an operator having to be exposed to high risk by means of operation in the area of danger.

Figure 8:
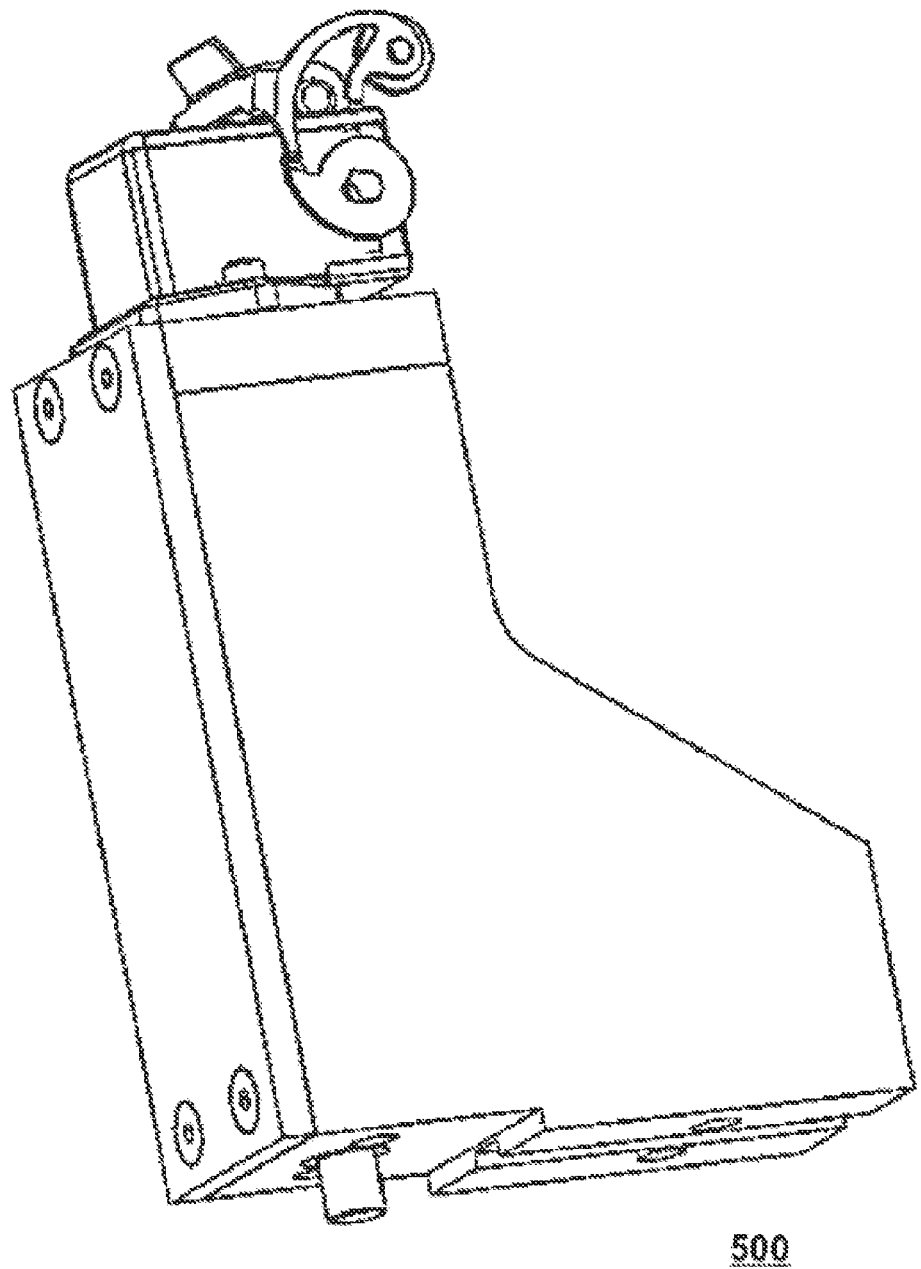
FIG. 8 shows, in a perspective illustration, an automatic feed activation device for use with a high-frequency motor according to FIGS. 4a and 4b, of a device for machining pipes or pipe ends according to FIG. 6 and/or with a remote control according to FIGS. 7a and 7b.

The automatic feed activation device 500 illustrated in FIG. 8 is connected here in such a manner to the remote control 400 shown in FIGS. 7a and 7b that, on the basis of an electric pulse which is emitted by the remote control, a mechanical pulse generator, in the specific case a feed pin is extended in the automatic feed activation device 500 by means of an electric lifting magnet, said feed pin, during each (mechanical) pulse, causing a feed spindle to be moved on a feed slide of the device for machining pipes or pipe ends 300 and therefore causing a machining tool (parting or chamfering tool) arranged on the device for machining pipes or pipe ends 300 to be supplied radially to the pipe. This machining operation can be safely controlled remotely with the aid of the automatic feed activation device 500.

It should be noted at this juncture that all of the above-described parts, in particular the features described in the exemplary embodiments, as seen on their own and in any combination are claimed as essential to the invention. A person skilled in the art is familiar with modifications thereof.

LIST OF DESIGNATIONS

10 Force transmission device
11 Force transmission elements
15 First toothed ring
16 Second toothed ring
20 Force absorption device
21 Force absorption elements
30 Closure device
31 Snap-type closure
100 Coupling device
200 Drive device
300 Device for machining pipes or pipe ends
400 Remote control
500 Automatic feed activation device
600 Inverter
A Drive axis
K Coupling axis
R1 First toothed ring radius
R2 Second toothed ring radius

The invention claimed is:

1. A coupling device for a force-related connection of a device for machining pipes or pipe ends to a drive device, wherein the coupling device has at least one force transmission device with at least one force transmission element for transmitting rotary forces to at least one force absorption element of at least one force absorption device with respect to a drive axis, wherein the at least one force transmission device is configured to be brought into connection with force absorption devices which differ in design with respect to the at least one force absorption element thereof, wherein the force transmission device has force transmission elements in a form of toothed rings on at least one toothed ring.

2. The coupling device as claimed in claim 1, wherein the coupling device furthermore has at least one releasable closure device which is configured to hold a respective force absorption device brought into connection with the at least one force transmission device axially and/or radially in position when the closure device is in a closed position.

3. The coupling device as claimed in claim 2, wherein the closure device is an annular closure device which is optionally tensionable and relaxable with respect to a circumference thereof, and the annular closure device is optionally tensionable and relaxable with respect to the circumference thereof with the aid of a snap-type closure.

4. The coupling device as claimed in claim 2, wherein the closure device is an annular closure device which is tensionable and relaxable with respect to a circumference thereof.

5. The coupling device as claimed in claim 1, wherein the force transmission device has at least two toothed rings respectively differing in radius.

6. A drive device with a coupling device as claimed in claim 1, wherein the drive device is configured to be connected to the device for machining pipe ends with the aid of the force transmission device of the coupling device for transmitting rotary forces with respect to the drive axis.

7. The drive device as claimed in claim 6, wherein the drive device is a high-frequency motor.

8. The drive device as claimed in claim 6, wherein the at least one force transmission device of the coupling device is fastened releasably on the drive axis of the drive device.

9. The coupling device as claimed in claim 1, wherein the force absorption devices differ in design with respect to a centre distance between the at least one force absorption element.

10. The coupling device as claimed in claim 1, wherein the coupling device is configured such that different pipe machining and working machines, can be universally connected to different drive devices.

11. An assembly, comprising:
a device configured to machine pipes or pipe ends;
a drive device; and
a coupling device providing force-related connection of the device configured to machine machining pipes or pipe ends to the drive device,
wherein the coupling device has at least one force transmission device with at least one force transmission element for transmitting rotary forces to at least one force absorption element of at least one force absorption device with respect to a drive axis, wherein the at least one force transmission device is configured to be brought into connection optionally and alternately with force absorption devices which each differ in design with respect to the at least one force absorption element thereof, wherein the force transmission device has force transmission elements in a form of toothed rings on at least one toothed ring.

12. The assembly of claim 11, wherein the force absorption devices differ in design with respect to a centre distance between the force absorption elements.

13. The assembly of claim 11, wherein the coupling device furthermore has at least one releasable closure device which is configured to hold a respective force absorption device brought into connection with the at least one force transmission device axially and/or radially in position when the closure device is in a closed position.

14. The assembly as claimed in claim 13, wherein the closure device is an annular closure device which is optionally tensionable and relaxable with respect to a circumference thereof, and the annular closure device is optionally tensionable and relaxable with respect to the circumference thereof with the aid of a snap-type closure.

15. The assembly as claimed in claim 13, wherein the closure device is an annular closure device which is optionally tensionable and relaxable with respect to a circumference thereof.

16. The coupling device as claimed in claim 11, wherein the force transmission device has force transmission elements in a form of toothed rings on at least one toothed ring.

17. The coupling device as claimed in claim 16, wherein the force transmission device has at least two toothed rings respectively differing in radius.

18. An assembly, comprising:
a coupling device configured for force-related connection of a device for machining pipes or pipe ends to a drive device, wherein the coupling device has at least one force transmission device with at least one force transmission element for transmitting rotary forces to at least one force absorption element of at least one force absorption device with respect to a drive axis, wherein the at least one force transmission device is configured to be brought into connection optionally and alternately with force absorption devices which each differ in design with respect to the at least one force absorption element thereof, wherein the force transmission device has force transmission elements in a form of toothed rings on at least one toothed ring.

19. The coupling device as claimed in claim 18, wherein the force transmission device has force transmission elements in a form of toothed rings on at least one toothed ring.

20. The coupling device as claimed in claim 19, wherein the force transmission device has at least two toothed rings respectively differing in radius.

21. The coupling device as claimed in claim 19, wherein a closure device is an annular closure device which is optionally tensionable and relaxable with respect to a circumference thereof, and the annular closure device is optionally tensionable and relaxable with respect to the circumference thereof with the aid of a snap-type closure.

22. A drive device with a coupling device as claimed in claim 18, wherein the drive device is configured to be connected to the device for machining pipe ends with the of the force transmission device of the coupling device for transmitting rotary forces with respect to the drive axis.

23. The coupling device as claimed in claim 18, wherein the force absorption devices differ in design with respect to a centre distance between the at least one force absorption element.

* * * * *